United States Patent
Kufeld et al.

(10) Patent No.: US 9,340,627 B1
(45) Date of Patent: May 17, 2016

(54) ELBOW AND HORIZONTAL CONFIGURATIONS IN A LOOP REACTOR

(71) Applicant: Chevron Phillips Chemical Company, LP, The Woodlands, TX (US)

(72) Inventors: Scott E. Kufeld, Houston, TX (US); Joel A. Mutchler, Kingwood, TX (US); Ralph W. Romig, Kingwood, TX (US); John D Stewart, Friendswood, TX (US); Catherine M Gill, Kingwood, TX (US); Bruce E. Kreischer, Kingwood, TX (US); John D. Hottovy, Kingwood, TX (US)

(*) Notice: Subject to any disclaimer, the term of this patent is extended or adjusted under 35 U.S.C. 154(b) by 0 days.

(21) Appl. No.: 14/283,717

(22) Filed: May 21, 2014

(51) Int. Cl.
| | | |
|---|---|---|
| *B01J 19/18* | (2006.01) | |
| *C08F 2/00* | (2006.01) | |
| *C08F 210/00* | (2006.01) | |
| *C08F 2/01* | (2006.01) | |
| *B01J 19/24* | (2006.01) | |

(52) U.S. Cl.
CPC .............. *C08F 2/01* (2013.01); *B01J 19/2405* (2013.01); *B01J 19/245* (2013.01); *B01J 19/2455* (2013.01); *B01J 2219/24* (2013.01)

(58) Field of Classification Search
CPC ............. B01J 19/1806; B01J 19/1837; B01J 19/1862; B01J 19/0046; B01J 2219/185; B01J 2219/182; B01J 2219/0006; B01J 2219/00063; B01J 2219/00065; B01J 2219/00069; B01J 2219/00094; B01J 2219/00108; B01J 2219/00162; B01J 2219/00164; C08F 110/06; C08F 110/02
USPC .................... 526/348, 64; 422/132
See application file for complete search history.

(56) References Cited

U.S. PATENT DOCUMENTS

| | | |
|---|---|---|
| 3,248,179 A | 4/1966 | Norwood |
| 6,239,235 B1 | 5/2001 | Hottovy et al. |
| 7,033,545 B2 | 4/2006 | Kufeld et al. |
| 8,349,947 B2 | 1/2013 | Marissal |
| 2003/0023011 A1* | 1/2003 | Hottovy et al. ............... 526/72 |
| 2011/0288247 A1 | 11/2011 | Hottovy |

* cited by examiner

*Primary Examiner* — William Cheung

(57) ABSTRACT

A reactor system containing one or more loop reactors for olefin polymerization is provided. The loop reactors include vertical sections, elbow sections, and/or horizontal sections connected into one or more loop reaction zones to polymerize an olefin monomer in the presence of a liquid diluent into a slurry comprising particles of a polyolefin polymer. The reactor system footprint is reduced to increase production efficiency and save cost, while maintaining a high processing capacity. In one embodiment a horizontal length ($L_H$) of at least one horizontal section is greatly reduced with maintained processing capacity. In another embodiment, at least one elbow section of the reactor system is configured to maintain a Dean number ($D_n$) of the slurry flowing therein to be higher than 3,000,000.

32 Claims, 5 Drawing Sheets

ELBOW AND HORIZONTAL CONFIGURATIONS IN A LOOP REACTOR

BACKGROUND OF THE INVENTION

1. Field of the Invention

The present invention generally relates to a reactor system for olefin polymerization, and more particularly to a reactor system for optimizing the production of polyolefin polymers in a high-efficiency loop reactor.

2. Related Art

This section introduces information from the art that may be related to or provide context for some aspects of the techniques described herein, claimed below, or both. This information is background facilitating a better understanding of that which is disclosed herein. This is a discussion of "related" art. That such art is related in no way implies that it is also "prior" art. The related art may or may not be prior art. The discussion is to be read in this light, and not as admissions of prior art.

As chemical and petrochemical technologies have advanced, the products of these technologies have become increasingly prevalent in, society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

One benefit of producing polyolefin is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and co-monomers), such as ethylene, propylene, butene, pentene, hexene, octene, decene, and other building blocks of the much longer polyolefin polymers. These monomers and co-monomers may be polymerized in processes comprising a liquid-phase polymerization reactor, gas-phase polymerization reactor, or combinations thereof. As polymer chains develop during polymerization in the reactor, solid particles known as "fluff", "flake" or "powder" are produced in the reactor.

It was soon discovered that a more efficient way to produce such solid particles of polymers was to carry out the polymerization process under continuous slurry conditions in a pipe loop reactor with the product being taken off from a number of settling legs attached to the bottom horizontal portions of the pipe loop reactor. Multiple settling legs are installed and operated on a batch principle to recover solid polymer products. This technique has enjoyed international success with billions of pounds of ethylene polymers being so produced annually. With this success has come the desirability of building large reactors as opposed to a large number of small reactors for a given plant capacity.

However, the use of multiple settling legs presents at least two problems. First, it imposes a "batch" product recovery technique onto a basic process that requires continuous circulation of a slurry within a loop reaction zone. Thus, problems arise when a settling leg reaches a pre-determined stage where it "dumps" or "discharges" accumulated polymer slurry. Each time a single settling leg operates to recover slurry from the loop reactor, it would cause an interference with the flow of the slurry circulating upstream within the loop reactor and the operation of a reactant recovery system connected downstream. Also, valve mechanisms connecting the settling legs to the loop reactor upstream and the reactant recovery system downstream have to be large in their diameters, thus requiring frequent, seal-off of these valves. There is significant difficulty in maintaining a tight seal. Settling legs may also plug from time to time. Thus, frequent reactor down time for scheduled maintenance is unavoidable, thereby reducing production efficiency and incurring high production cost.

Secondly, as loop reactors have gotten larger, the use of multiple settling legs have inevitably presented many logistic problems. In a loop reactor, if a pipe diameter is doubled, the volume of the loop reactor goes up four-fold. However, because of the valve mechanisms involved, the size of the settling legs cannot easily be increased further. Hence, a larger number of settling legs become necessary to meet the large footprint configuration, which in turn begins to exceed the physical space of the land available for setting up these large-scale, high production capacity loop reactors.

In spite of these limitations, settling legs have continued to be employed where olefin polymers are formed as slurry in a liquid diluent. This is because, unlike bulk slurry polymerizations (i.e. no inert diluent) where solids concentrations of better than 60 percent are routinely obtained, olefin polymer slurries in a diluent are generally limited to less than 50 percent solids. Hence settling legs have been believed to be necessary to give a final slurry product having a greater solids concentration. This is because, as the name implies, settling occurs in the legs, and thus the concentration of the solid particles finally recovered from the slurry settled within the settling legs are higher. Another factor affecting maximum solid concentration within these loop reactors is circulation velocity, with a higher velocity for a given reactor diameter allowing for higher concentration of the solids produced, since a limiting factor in a circulating loop operation is fouling due to polymer build up in the walls of the loop reactor. Without meaning to be bound by any particular theory, such fouling may be due to operation at solid particle concentrations above a level where the solids can remain suspended without settling within the reactor (i.e., saltation).

One way to improve production efficiency compared to the use of multiple settling legs is to employ a continuous product take-off line or other similar mechanism to continuously withdraw slurry products from the loop reactor. In addition, there is a need to reduce the footprint of a loop reactor that takes up less land space (at least in the horizontal dimension) and saves production cost, while still maintaining high production capacity and efficiency. For example, a single continuous product take-off line can replace multiple settling legs, resulting in similar productivity while reducing reactor footprint and simplifying reactor control mechanisms.

SUMMARY

The present invention is directed to resolving, or at least reducing, one or all of the problems mentioned above. Various embodiments of the present invention include a loop reactor for olefin polymerization. The loop reactor includes vertical sections and elbow sections connecting the vertical sections to either a horizontal section or another elbow section. These sections within the loop reactor are configured into at least one loop reaction zone to polymerize an olefin monomer in the presence of a liquid diluent into a slurry comprising particles of a polyolefin polymer.

In one aspect, at least one elbow section having an internal diameter (d) and a radius ($R_c$) of an inner curvature is described, wherein the at least one elbow section is configured to maintain a Dean number ($D_n$) of the slurry flowing therein to be higher than 3,000,000, where $D_n = \rho V d / \mu * (d/2R_c)^{1/2}$ and where $\rho$ is a density of the slurry, V is a circulation velocity of the slurry, and $\mu$ is a dynamic viscosity of the slurry. In another aspect, a horizontal length ($L_H$) of the horizontal section is less than about 3 feet. In yet another aspect, the loop reactor could further include one or more settling leg assemblies extending from the horizontal section. In another embodiment, the loop reactor could further include one or more continuous take off (CTO) assemblies extending from at least one of the elbow sections or the horizontal section.

Still further, one embodiment of the invention provides that a chord length (W) of the at least one elbow section is 250 inches or less. Another embodiment of the invention provides that the radius ($R_c$) of the inner curvature is 72 inches or less as determined by $R_c = H/2 + W^2/8H$, where H is a height of the at least one elbow section. In another embodiment, the circulation velocity (V) of the slurry within the at least one loop reaction zone is maintained at about 9 meters per second (m/s) or higher. Alternatively, the circulation velocity (V) of the slurry within the at least one loop reaction zone is maintained at about 9 meters per second or lower. In still another embodiment, a. Reynolds number of the slurry within the at least one elbow section is maintained at about 11,000,000 or higher. In yet another embodiment, a reactor system for olefin polymerization includes one or more reactors configured in series or in parallel for processing polyolefin and a loop reactor.

In another embodiment, a process for olefin polymerization in a loop reactor is provided and includes polymerizing an olefin monomer in the presence of a liquid diluent into a slurry comprising particles of a polyolefin polymer inside at least one loop reaction zone of a loop reactor. The process may further includes continuously withdrawing the slurry from one or more continuous take off assemblies of the at least one loop reactor zone. In another embodiment, the process may further includes periodically withdrawing the slurry from the at least one loop reactor zone, such as withdrawing from one or more settling leg assemblies extending from the horizontal section.

The above paragraphs present a simplified summary of the presently disclosed subject matter in order to provide a basic understanding of some aspects thereof. The summary is not an exhaustive overview, nor is it intended to identify key or critical elements to delineate the scope of the subject matter claimed below. Its sole purpose is to present some concepts in a simplified form as a prelude to the more detailed description set forth below.

BRIEF DESCRIPTION OF THE DRAWINGS

The following figures form part of the present specification and are included to further demonstrate certain aspects of the present invention. Advantages of the invention may become apparent to one of skill in the art upon reading the following detailed description and upon reference to the following drawings.

DETAILED DESCRIPTION

Figure 1:
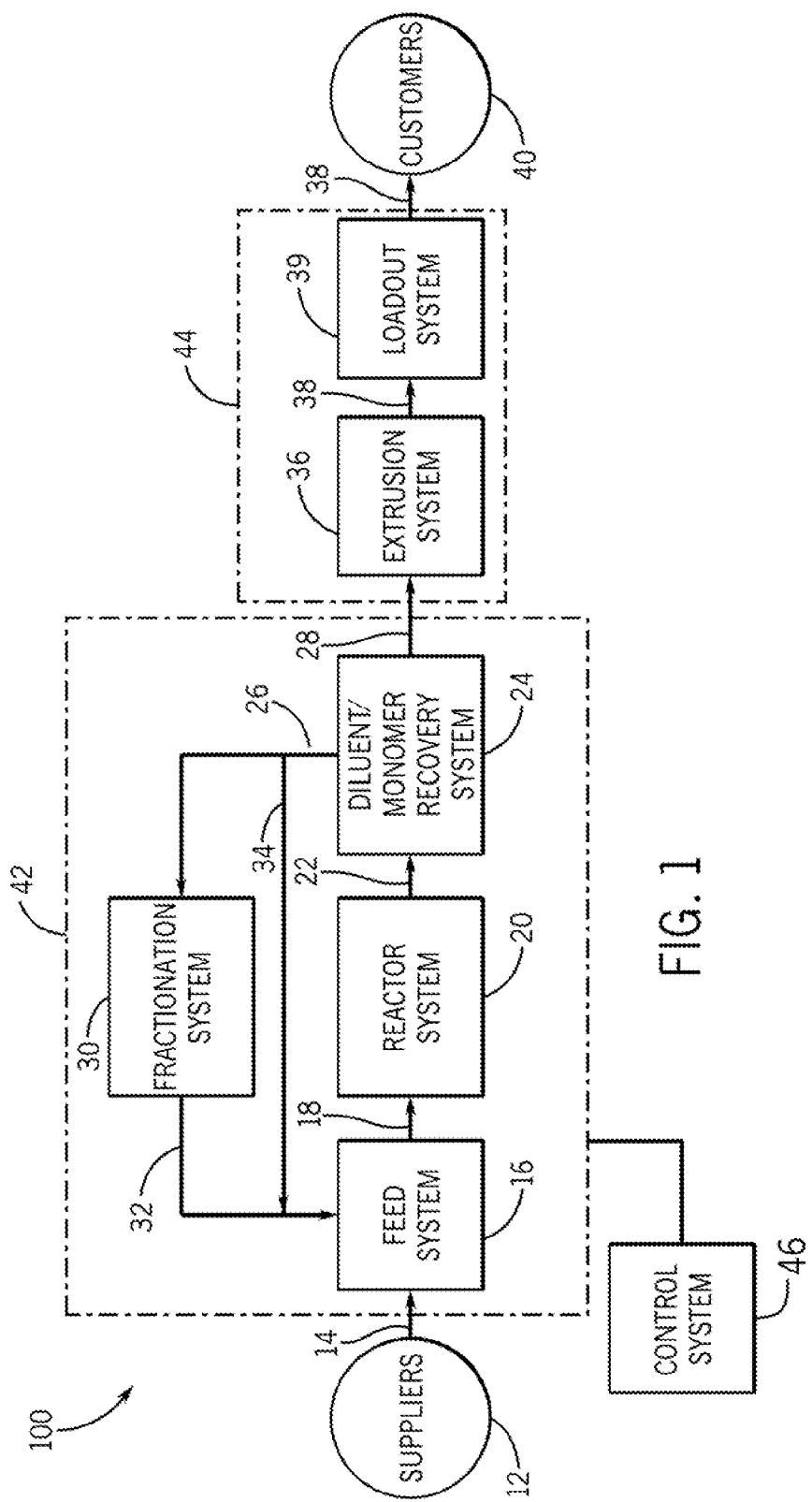
FIG. 1 illustrates a block flow diagram depicting an exemplary polyolefin production system having one or more loop reactors for producing polyolefin in accordance with embodiments of the present techniques.

Illustrative embodiments of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort even if complex and time-consuming, would be a routine undertaking for those of ordinary skill in the art having the benefit of this disclosure.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations. In some alternate implementations, the functions/actions/structures noted in the Figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved.

In the description below, unless otherwise specified, all compounds described herein may be substituted or unsubstituted and the listing of compounds includes derivatives thereof. Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Embodiments described herein include the reduction of the footprint of one or more loop reactors in a large-scale polyolefin production system, while maximizing the settling concentration of the recovered slurry production and maintaining the flow rate and the velocity of the slurry circulating within the loop reactors, thereby significantly reducing the capital cost for polyolefin production. In one embodiment, significant improvement of the configuration of at least a loop reaction zone within a loop reactor is provided such that the vertical dimension (e.g., the Z axis or the axis parallel to earth gravity) of the loop reactor remains an efficient configuration for large scale, high capacity polyolefin production, while the horizontal dimension (e.g., the X-Y plane of a physical land property that the loop reactors occupy) is significantly reduced to save land space and capital cost. In another embodiment, at least a horizontal section of the loop reactor is reduced and optimized to reduce reactor footprint and capital cost, while maintaining slurry circulation in the elbow section.

FIG. 1 depicts one example of a polyolefin production system 100 for producing polymers, such as polyolefin and the like. The polyolefin production system 100 may generally include a wet reaction end 42 and a dry finish end 44, which are connected to a control system 46 to process one or more feedstocks 14 (e.g., monomer reactants, diluents, catalysts and/or other chemical compounds) into reaction products (e.g., a slurry, a polyolefin fluff, a polyolefin pellet 38, and the like). The feedstocks 14 may be provided from various suppliers 12 (e.g., via pipelines, ships, trucks, cylinders, drums, and so forth), and supplied to the polyolefin production system 100 via off-site and/or on-site facilities, (e.g., olefin plants, refineries, catalyst plants, and the like).

The wet reaction end 42 of the polyolefin production system 100 generally includes a feed system 16, a reactor system 20, a recovery system 24 and a fractionation system 30 and is adapted to process the feedstocks 14 into a slurry and/or a polyolefin fluff stream 28 in wet or liquid phase. The dry finish end 44 is connected to or in fluid communication with the wet reaction end 42, and may include an extrusion system 36 and a loadout system 39 to process the polyolefin fluff 28 in dry phase into a polyolefin pellet 38. The polyolefin pellet 38 is then delivered into one or more customers 40.

The feed system 16 is adapted to supply the feedstocks 14 into the reactor system 20 via one or more feed lines 18. The feed system 16 is configured to meter and control the addition rate of the feedstocks 14 into the feed lines 18 for maintaining the desired reactor stability and achieving the desired polyolefin properties or production rate. The feed system 16 may also be configured to receive, store, treat, and meter one or more monomers or diluents, which are recovered as reactor effluent streams from the recovery system 24 and recycled into the reactor system 20. A plurality of the feed lines 18 may be used to feed various streams of monomer, comonomer, diluent, catalysts, co-catalysts, hydrogen, additives, or combinations thereof to the reactor system 20. The feed lines 18 may tap into the wall of the polymerization loop reactor within the reactor system 20. In general, a single feed system may be dedicated to a particular loop reactor. Alternatively, a plurality of the feed systems 16 may be used in the reactor system and coupled to one or more loop reactors disposed and operated in series or in parallel. Further, the feed system 16 may optionally receive recycled, non-polymer components from one or more downstream processing systems.

Exemplary feedstocks 14 may include, but are not limited to, olefin monomers, comonomers, diluents, catalysts, co-catalysts, activators, chain transfer agents, molecular-weight control agents, co-reactants, additives, and combinations thereof. Suitable olefin monomers and comonomers may include ethylene, propylene, butene, hexene, octene, decene, and combinations thereof, among others. The olefin monomer and comonomers may be present in a liquid, gaseous, or supercritical fluid phase, depending on the type of the reactor system 20 used. Such olefin monomers and comonomers are generally 1-olefins having up to 10 carbon atoms per molecule and may include no branching nearer the double bond than the 4-position, such as 1-pentene, 1-hexene, 1-octene, and 1-decene.

Suitable diluents may include propane, isobutane, n-butane, n-pentane, i-pentane, neopentane, cyclopentane, methylcyclopentane, ethylcyclopentane, n-hexane, cyclohexane, n-heptane, and combinations thereof, among others.

The expression "chain transfer agent", or alternatively "molecular-weight control agent", as used herein, shall be understood to mean an agent that will provide an active hydrogen or halogen that can be abstracted during a polymerization reaction. Chain transfer reactions stop a growing radical chain during the polymerization and start a new one in its place. Thus, chain transfer results in shorter chains, lower degrees of polymerization, and lower molecular weights. One example of a suitable chain transfer agent or molecular-weight control agent is hydrogen; however, other chain transfer agents may be used in the methods and processes of the present invention, as the chain transfer agents may vary with the type of polymerization involved. Other exemplary chain transfer agents include but are not limited to mercaptans, aromatic compounds with benzylic hydrogens, alkyl halides, and halogenated hydrocarbons (such as carbon tetrachloride and carbon tetrabromide).

Suitable catalysts may include Ziegler-Natta catalysts, chromium catalysts, metallocene catalysts, and combinations thereof, among others. The one or more catalysts fed into the reactor system 20 may be heterogeneous, homogenous, supported, and/or unsupported. Suitable co-catalysts may include borates, tri-ethylboron, methyl aluminoxane, triethylboron, methyl aluminoxane, borates, organoaluminum compounds (such as tri-ethylaluminum and tri-isobutylaluminum, triethylaluminum), and combinations thereof, among others. Suitable activators or co-catalysts may include solid super acids, additives, and combinations thereof, among others.

In FIG. 1, the feed system 16 may include storage tanks, vessels, cylinders, and other containers to store the feedstocks 14 therein. The feed system 16 may also include treatment beds, such as molecular sieve beds, aluminum packing, etc., to process or treat the feedstocks 14 prior to being fed into the feed lines 18. Any unwanted components present within the feedstocks 14 may be removed after treatment. Examples of unwanted components within the feedstocks 14 include catalyst poisons, such as water, oxygen, carbon monoxide, carbon dioxide, and organic compounds containing sulfur, oxygen, and/or halogens, among others. In other embodiment, the feedstocks 14 may be fed directly into the reactor system 20 without being stored in the feed system 16. For example, ethylene monomer can be fed directly into the reactor system 20 without intermediate storage in the feed system 16.

The feed system 16 may be configured to prepare or condition the feedstocks 14, such as catalysts, prior to being fed into the reactor system 20. For example, a catalyst may be prepared in catalyst preparation tanks to be mixed with a diluent (e.g., isobutane or hexane) or mineral oil. Furthermore, in operation, the feed system 16 may also store, treat, and meter recovered reactor effluent for recycle to the reactor. Indeed, operations in the feed system 16 generally receive both feedstock 14 and recovered reactor effluent streams.

The reactor system 20 may include one or more loop reactors connected together and is adapted to carry out a polymerization reaction therein. For example, one polymerization reaction may be the addition and polymerization of olefin monomers and comonomers into a long chain polyolefin polymer compound in the presence of diluents, catalysts and/or other chemicals. In one embodiment, the loop reactors within the reactor system 20 are designed and uniquely configured to increase polyolefin production capability, operation flexibility, and efficiency, and reduce system footprint and production cost.

In one example, the reactor system 20 within the polyolefin production system 100 is configured to operate a plurality of loop polymerization reactors connected and operated in series and/or in parallel, as a coupled operation of the loop reactor and/or as a decoupled or independent operation. This capability to shift operation of a set of polymerization loop reactors between a series operation and a parallel operation provides flexibility in producing mono-modal and/or multi-modal (e.g., bimodal) polyolefin polymers, and in scheduling reactor shutdown and maintenance flexibility. In certain embodiments, at least two slurry loop reactors are run in series and then decoupled to run in parallel or decoupled with one reactor run while the other reactor is down for maintenance. This gives the plant flexibility to produce bimodal polyolefin polymer products and switch to single polyolefin polymer product for varying markets conditions. The parallel reactors could run on separate parallel feed lines and peripheral recovery systems or shared feed systems and recovery systems.

In one embodiment, the reactor system 20 may include one or more slurry polymerization reactors. The polymerization reactors may be of the same type or different types, and arranged serially or in parallel, to produce a polyolefin particulate product, such as the polyolefin fluff 28, generically referred to as "fluff" herein. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor for producing polyolefin, such as polyethylene or polypropylene, is discussed in the present context though it is to be understood that the present techniques may be similarly applicable to other types of liquid phase reactors.

In another embodiment, the reactor system 20 may include one or more loop reactors connected together into at least one loop reaction zone for carrying a polymerization reaction. Each loop reactor may include four vertical sections, four horizontal sections, and eight elbow sections. In another example, each loop reactor may include six vertical sections, six horizontal sections, and twelve elbow sections. In still another example, one loop reactor may include two loop reaction zones, where at least one loop reaction zone is formed by four vertical sections, four horizontal sections, and eight elbow sections, while another loop reaction zone is formed by other suitable combination of vertical sections and horizontal sections that are connected by elbow sections. Exemplary reactor system configurations, loop reactors and loop reaction zones for slurry polymerization includes those disclosed in U.S. Pat. No. 6,239,235, U.S. Pat. No. 7,033,545, and U.S. Patent Application Publication No. 2011/0288247, each of which is incorporated herein by reference in its entirety for its description of loop reactors and their diameters, lengths, equipment, and operation.

Figure 2:
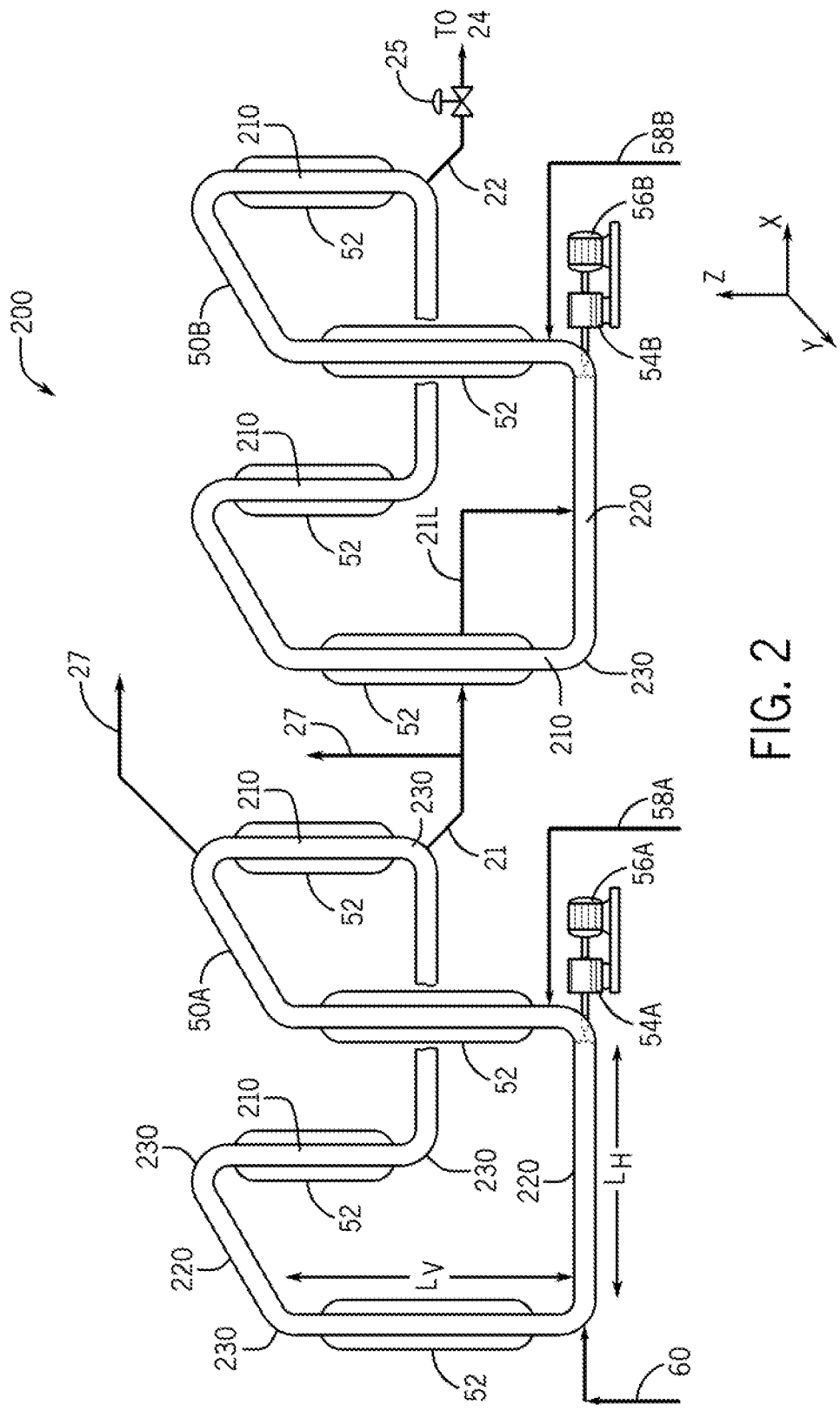
FIG. 2 illustrates an exemplary reactor system that can be used in the polyolefin production system of FIG. 1 in accordance with embodiments of the present techniques.

FIG. 2 depicts a reactor system 200 as one example of the one or more loop reactors within the reactor system 20. The reactor system 200 may include two or more loop reactors 50A, 50B connected together into one or more loop reaction zones and can be flexibly switched between operations in series or in parallel for producing polyolefin. The loop reactors 50A, 50B may include a plurality of vertical sections 210 and horizontal sections 220 (e.g., upper horizontal sections and lower horizontal sections, etc., where these upper and lower horizontal segments define upper and lower zones of horizontal flow). For example, the loop reactor 50A, 50B may include eight to sixteen or other number of the vertical sections 210, such as jacketed vertical pipe legs, approximately 24 inches in diameter and approximately 200 feet in length.

Figure 3A:
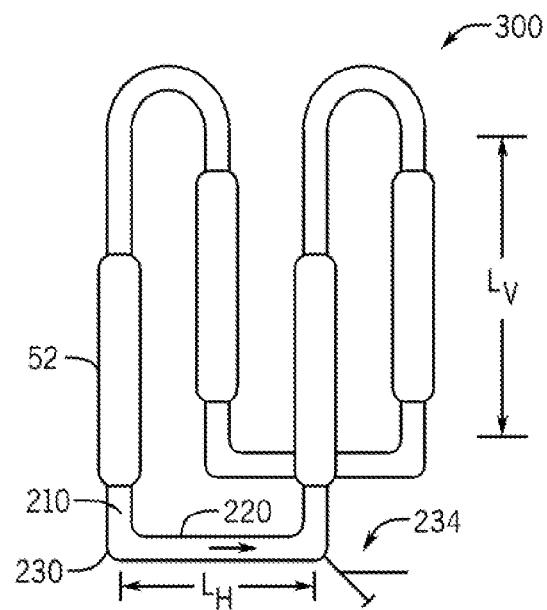
FIG. 3A illustrates a loop reactor that can be used in a portion of the polyolefin production system of FIG. 1 in accordance with embodiments of the present techniques.
Figure 3B:
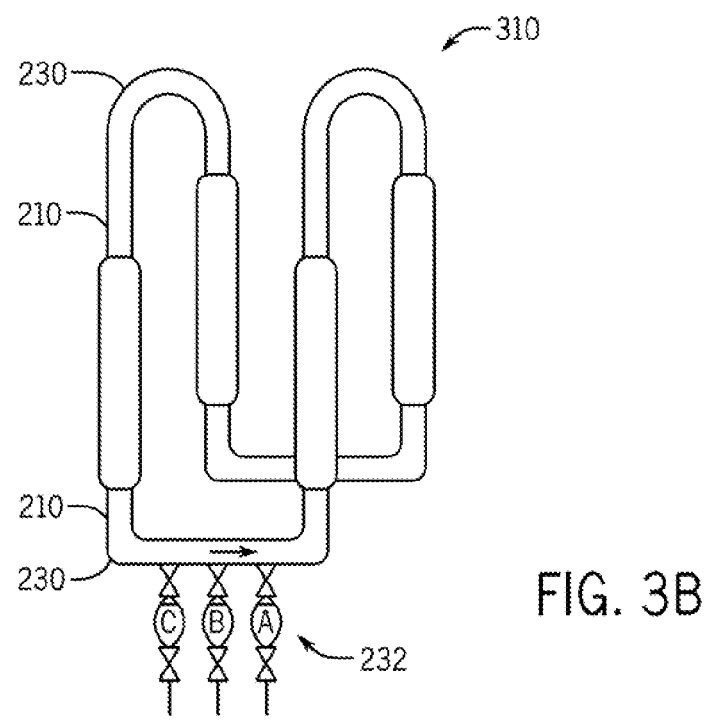
FIG. 3B illustrates a loop reactor that can be used in a portion of the polyolefin production system of FIG. 1 in accordance with alternate embodiments of the present techniques.
Figure 3C:
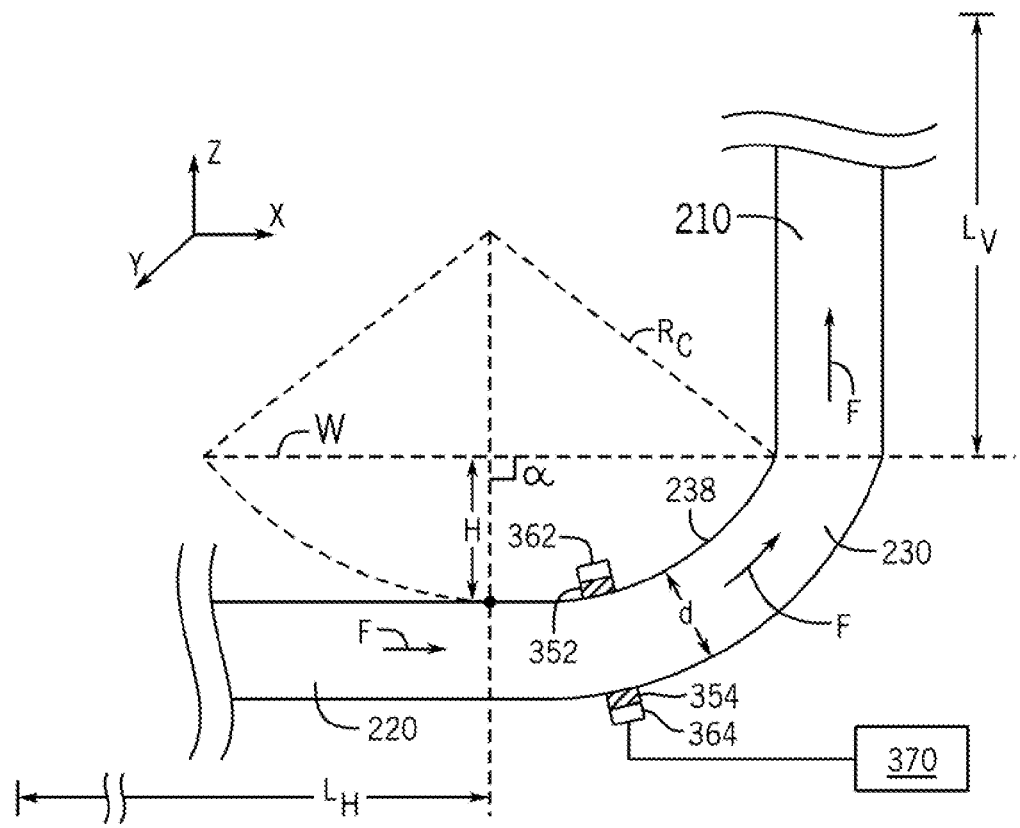
FIG. 3C illustrates a portion of a loop reactor within the polyolefin production system of FIG. 1 in accordance with alternate embodiments of the present techniques.

As shown in FIG. 2, the vertical section 210 and the horizontal section 220 are connected by a smooth bend (e.g., an elbow section 230), thus providing a continuous flow path substantially free from internal obstructions among the one or more loop reaction zones within the loop reactors 50A, 50B of the reactor system 200. In one example, an elbow section can be used to connect a terminal end of a horizontal section to a terminal end of the closest vertical section (for convenience and clarity, only some of the vertical sections, horizontal sections and elbow sections are numbered in FIG. 2). For example, two elbow sections 230 may be used to connect the top and bottom portions of each vertical section 210 with another horizontal section 220 or another elbow section 230. As another example, two elbow sections 230 may be used to connect both ends of a horizontal section 220 with two vertical sections 210. In general, two identical elbow sections are formed into an arc (of a hypothetical circle, where an inner curvature 238 of each elbow section 230 forms half of the arc of the hypothetical circle, and the hypothetical circle has a radius ($R_c$) as shown in FIG. 3C). Each vertical section 210 has a vertical length ($L_V$), and each horizontal section 220 has a horizontal length ($L_H$). Note that the respective vertical lengths ($L_V$) and horizontal lengths ($L_H$) do not have to be the same.

In general, the polymerization reaction within the reactor system 200 is exothermic and removal of the heat of reaction is required. The loop reactors 50A, 50B may be cooled by means of a heat exchanger. For example, each leg or vertical section 210 may be protected and surrounded by a heat exchanger, such as a cooling jacket 52 or other suitable pipe-shaped heat exchangers, configured to surround the vertical sections 210 and/or other sections. FIG. 2 illustrates two four-legged reactors, each with 4 vertical sections arranged vertically. The vertical section 210 surrounded with the cooling jacket 52 could also be arranged horizontally. The cooling jackets 52 are configured with cooling medium (e.g., water, and other coolants) flowing therein to remove heat.

One or more feed lines 58A, 58B are used to introduce monomers (and/or co-monomers, if any), one or more diluents, and/or other chemical components into the loop reactors 50A, 50B, respectively. The feed lines 58A, 58B may be connected to the loop reactors 50A, 50B directly at one or more locations or can be combined and fed into a single line, such as a condensed diluent recycle line. In addition, one or more feed lines 60 are used to introduce catalysts and other additives into the loop reactors 50A, 50B. The feed lines 58A, 58B, 60 generally correspond to the feed line 18 of FIG. 1.

Reaction conditions, such as temperature, pressure, and reactant concentrations, in each loop reactor 50A, 50B are regulated to facilitate desired properties and production rate of the polyolefin polymer products generated therein, and control stability of the loop reactors 50A, 50B. Temperature is typically maintained below a level at which the polymer product would go into solution, swell, soften, or become sticky. Due to the exothermic nature of the polymerization reaction, a cooling fluid may be circulated through the cooling jackets 52 around portions of the loop slurry reactor 50A, 50B to remove excess heat, thereby maintaining the temperature within a desired range, generally between about 150° F. and about 250° F. (about 65° C. to about 121° C.). Likewise, pressure in each loop reactor 50A, 50B may be regulated within a desired pressure range, generally in a range between about 100 psig and about 800 psig, such as from about 450 psig to about 700 psig. In one example, a monomer of ethylene and a comonomer of 1-hexene can be polymerized at a reaction temperature into a polyethylene polyolefin polymer, which is substantially insoluble in a fluid medium, thereby forming a slurry of solid particulates therein.

Further, the loop reactors 50A, 50B may also include other mechanisms or instruments to measure and/or control process variables, such as temperature, pressure, flow rate of the feedstock, slurry density, speed of the fluid, speed of the circulating slurry, and so forth. Such instrumentation may include one or more sensors or sensing elements, transmitters, and so forth, located within or outside of the reactors 50A, 50B, as appropriate. For a pressure control mechanism, a sensing element, for example, a diaphragm, may be used. For a temperature control instrument, a sensing element, such as a thermocouple, a resistance temperature detector (RTD), and the like, of which may be housed in a thermowell, for instance, may be used.

Various instruments may have local indication of the sensed process variables. For instance, a pressure control instrument may have a local pressure gauge and a temperature control instrument may be or have a local temperature gauge, both of which may be read locally by an operator or engineer, and controlled by the control system 46, for example. Transmitters can be used to convert a received analog signal from a sensing element to a digital signal for feed or transmission to a control system, for example, the control system 46.

The loop reactors 50A, SOB are used to carry out polyolefin (e.g., polyethylene (PE), polypropylene (PP)) polymerization under slurry conditions in which insoluble particles of polyolefin polymers are formed in a fluid medium and suspended as in slurry phase. The olefin monomers, the co-monomers, and the like may be polymerized in the presence of catalysts, liquid diluents, and the like into a mixture of a fluid slurry. The fluid slurry may include solid particles of one or more polyolefin polymers, the monomers, the liquid diluents, the diluents and the like.

The mixture of the polymerizing fluid slurry is circulated by means of an impeller (not shown), which is generally disposed within the interior of the loop reactors 50A, 50B to create a turbulent mixing zone within the fluid slurry and maintain a relatively constant slurry velocity and/or mass flow therein. The impellers within the loop reactors 50A, 50B may be driven by one or more motors 56A, 56B, which are coupled to a high performance pump, such as pump 54A, 54B. The pump 54A, 54B are connected to the impellers within the loop reactors 50A, 50B, respectively. Examples of pumps include in-line axial flow pumps and mixed-flow pumps. The impellers may also assist in propelling the fluid slurry through the loop reaction zone within each loop reactor at sufficient speed to keep solid particulates, such as catalysts or polyolefin polymer product particles, suspended within the fluid medium.

As shown in FIG. 2, the fluid slurry can be discharged from the loop reactors 50A, 50B, via a product slurry line 27, a slurry transfer line 21, or a fluff slurry product line 22, which are connected to or configured as one or more settling legs, valve mechanisms (e.g., Ram valves, modulating valves), and/or continuous take-off (CTO) assemblies (coupled with one or more Ram valves, modulating valves, or other valve configurations), among others.

The slurry transfer line 21 is configured to discharge the fluid slurry from the loop reactor 50A directly (e.g., via one or more product slurry lines 27) or into the loop reactor 50B (e.g., via a transfer line 21L) through a settling leg, an isolation valve (e.g., a Ram valve), a continuous take-off (which includes an isolation (Ram) valve and a modulating valve), or other valve configuration. The fluid flow within the slurry transfer line 21 can be regulated by one or more valve mechanisms and/or CTO assemblies coupled thereto. Alternatively, the slurry transfer line 21 may not be modulated and can function as a continuous slurry transfer line. In certain embodiments, the slurry transfer line 21 is rerouted to one of the product slurry line 27. In alternate embodiments, one product slurry line 27 is connected to the loop reactor 50A, for example, near one of the elbow sections 230, and the slurry transfer line 21 can be closed.

In one example, the fluid slurry discharged from the slurry transfer line 21 of the loop reactor 50A is continuous and not directly modulated. No CTO or settling leg is employed. Instead, the slurry transfer line 21 is coupled to a full-bore Ram valve maintained in a full-open position, and not additionally through a modulating valve. In another example, the slurry transfer line 21 is coupled to an isolation valve (e.g., a Ram valve or the like) positioned at the reactor wall and without a modulating valve. The Ram valve is provided to isolate the slurry transfer line 21 from the loop reactor 50A, if so desired. In still another example, a CTO with a modulating valve may be situated at the slurry transfer line 21 of the loop reactor 50A. If so included, the modulating valve may control flow rate of the fluid slurry transferred therein and facilitate pressure control within the loop reactor 50A.

In another example (not illustrated), a modulating valve may be disposed downstream on the slurry transfer line 21. In still another example, a Ram valve may be positioned at the outlet of the slurry transfer line 21 connected to the wall of the loop reactor 50B to provide for isolation of the slurry transfer line 21 from the loop reactor 50B, when such isolation is desired. It may be desired to isolate the slurry transfer line 21 from the loop reactors 50A, 50B during maintenance or downtime of the reactor system 200, or when an alternate discharge or transfer line from the loop reactor 50A is placed in service, and so on. The operation of the Ram valves may be manually controlled, hydraulic-assisted, air-assisted, remote-controlled, automated, and so on. The transfer line 21L can be manually removed from service (e.g., manually closing the Ram valves) or automatically removed (e.g., via a control system automatically closing the Ram valves) from service.

The fluff slurry product line 22 is configured to discharge the fluid slurry from the loop reactor 50B via a flow control valve 25 (e.g., a modulating valve) and into the recovery system 24 (which is also shown in FIG. 1). The fluff slurry product line 22 may be connected, directly or indirectly, to a settling leg, a continuous take-off (CTO) assembly, or other valve configurations to discharge the fluid slurry. The fluid slurry may be discharged intermittently, such as through a settling leg configuration. Alternatively, the fluid slurry may be discharged continuously, such as through a CTO assembly. A variety of discharge configurations are contemplated for a continuous discharge. For example, an isolation valve (e.g., full-bore Ram valve) without an accompanying modulating valve may be used for continuous discharge of the fluid slurry from the loop reactors 50A or 50B.

Pressure elements or instruments may be disposed on the loop reactors 50A, 50B and on the slurry transfer line 21. In some examples, the pressure in the loop reactor 50A may float on the pressure in the loop reactor 50B. The loop reactors 50A, 50B may be maintained at the same, similar, or different pressure. The inlet position of the slurry transfer line 21 may be coupled to the loop reactor 50A on the discharge side of the pump 54A in the loop reactor 50A. The outlet position of the slurry transfer line 21 may be coupled to the loop reactor 50B on the suction side of the pump 54B in the loop reactor 50B. Such a configuration may provide a positive pressure differential (i.e., a driving force) for the fluid slurry flowing through the slurry transfer line 21 from the loop reactor 50A to the loop reactor 50B. In one example, a pressure differential (provided from the discharge of the pump 54A to the suction of the pump 54B) is about 20 pounds per square inch (psi).

One embodiment of the invention provides that a polymerization reaction is carried out in a single loop reaction zone within the polyolefin production system 100 and the fluid slurry is continuously delivered through the loop reactors 50A, 50B and discharged into the fluff slurry product line 22, in another embodiment, the polymerization reaction within the polyolefin production system 100 is carried out in two loop reaction zones within the loop reactors 50A, 50B, respectively, and the fluid slurry is transferred from one loop reaction zone within the loop reactor 50A into another loop reaction zone within the loop reactor 50B, each reaction zone with its individual process variables.

A further embodiment of the invention provides significant improvement of the configuration of the vertical sections 210, horizontal sections 220, and the elbow sections 230 within the loop reaction zone of the loop reactors 50A, 50B of the polyolefin production system 100. The system footprint and support structure of at least one loop reactor is reduced, thereby increasing production efficiency and saving capital cost, while maintaining a high processing capacity. In one embodiment a horizontal length ($L_H$) of at least one horizontal section is greatly reduced. In another embodiment, at least one elbow section of the reactor system is configured to maintain a Dean number ($D_n$) of the slurry flowing therein to be higher than 3,000,000. At the same time, the vertical sections of the loop reactors 50A, 50B in the polyolefin production system 100 are configured to maintain its capacity for a total processing volume of the loop reactor measured at more than about 10,000 gallons, such as about 20,000 gallons or more, about 40,000 gallons or more, or about 50,000 or more. An exemplary nominal capacity for the exemplary production system 10 is about 700-1600 million pounds of polyolefin produced per year. Exemplary hourly design rates are approximately 70,000 to 200,000 pounds of polymerized/extruded polyolefin per hour. It should be emphasized, however, that the present techniques apply to polyolefin manufacturing processes including polyethylene production systems having nominal capacities and design rates outside of these exemplary ranges FIGS. 3A and 3B depict examples of loop reactors 300, 310 that can be used in such polyolefin production system for olefin polymerization. In one aspect, it is contemplated to configure at least one of the elbow sections 230 and maintain a Dean number ($D_n$) of the slurry flowing within the elbow section 230 to be higher than 3,000,000, where the elbow section 230 contains an internal diameter (d) and a radius ($R_c$) of an inner curvature. In one embodiment, the Dean number is measured as $\rho V d/\mu * (d/2R_c)^{1/2}$, where $\rho$ is a density of the fluid slurry as measured in an unit of, for example, lb/ft3, where V is the circulating velocity of the slurry in the elbow section as measured in an unit of, for example, meters per second, where d is the internal diameter of the elbow section 230 as measured in an unit of, for example, feet or inches, where $\mu$ is a dynamic viscosity of the fluid slurry as measured in an unit of, for example, lb/ft/sec, where $R_c$ is a radius of an inner curvature of an elbow section. 230 as measured in an unit of, for example, meters or feet. In another aspect, the vertical dimension (e.g., the Z axis or the axis parallel to earth gravity) of the loop reactors remains an efficient configuration for large scale, high capacity polyolefin production, while the horizontal dimension (e.g., the X-Y plane of a physical land property that the loop reactors occupy) is significantly reduced to save land space and capital cost.

As shown in FIGS. 3A-3D, one embodiment of the invention provides that the loop reactors 300, 310 may be configured to include a vertical length ($L_V$) of at least one of the vertical sections 210 to be much longer than a horizontal length ($L_H$) of at least one of the horizontal sections 220. For example, the vertical length ($L_V$) of at least one of the vertical sections 210 in a loop reaction zone of the loop reactors 50A, 50B, 300, 310, may be 3 times (3×) or larger than the horizontal length ($L_H$) of at least one of the horizontal sections 220, such as 60 times (60×) or larger, 80 times (80×) or larger, 100 times (100×) or larger, 1.50 times (150×) or larger, or 250 times (250×) or larger, in one example, the vertical length ($L_V$), as measured from the lowest Z axis value of a vertical section 210 to the highest Z axis value of the vertical sections 210 can be about 60 feet or larger, such as about 100 feet or larger, about 150 feet or larger, or about 300 feet or larger. In some embodiments, the vertical length ($L_V$) is between about 190 feet and 225 feet, between about 225 feet and 260 feet, or between about 260 feet and 300 feet. The vertical section 210 may be connected to the horizontal section 220 via at least one elbow section 230.

In another aspect, it is contemplated that the horizontal length ($L_H$) of at least one of the horizontal sections 220, next to the vertical section 210 and connected by a neighboring elbow section, is significantly reduced. As an example, the horizontal length ($L_H$) of the horizontal section 220 of the loop reactors 50A, 50B, 300, 310 as provided herein and as measured from one terminal end to another ter terminal end of the horizontal section 220 in the X-Y plane of a physical land property may be about 6 feet or smaller, such as about 3 feet or smaller, such as between about 1 feet and about 3 feet, e.g., about 18 inches, about 24 inches. As another example, the horizontal length ($L_H$) of at least one horizontal section can be configured to be zero, where the loop reactor contains no horizontal section at all and the vertical sections 210 are connected to the elbow sections 230, where two elbow sections are formed into an arc having a chord length (W) and a height (H), which forms into a perpendicular angle α. As used herein, the chord length (W) is defined to be the distance between two terminal ends of an arc, where the arc is formed by two identical elbow sections, i.e., two inner curvatures 238a, 238b of two elbow sections (as illustrated in detail in FIG. 3D). In such case, one elbow section is provided to connect a vertical section to another elbow section.

In FIG. 3A, the loop reactor 300 includes one or more continuous take-off (CTO) assemblies 234. Each CTO assembly 234 can be connected to an associated fluff slurry product line 22, as shown in FIGS. 1-2. Other configurations, for example, a configuration where multiple CTO assemblies feed a single fluff slurry product line 22 are contemplated within the scope of the present disclosure. The CTO assemblies 234 may be configured to extend from at least one of the elbow sections 230, as shown in FIG. 3A. Alternatively, the CTO assemblies 234 may be configured to extend from at least one of the horizontal section 220.

The CTO assemblies 234 may include one or more valve mechanisms, such as an isolation valve (e.g., a Ram valve), a modulating valve (e.g., a v-ball valve), or other valve configuration. In one example, the CTO assemblies 234 may include a modulating valve to control the continuous discharge of the fluid slurry from the loop reactor. In another example, the CTO assemblies 234 may include an isolation valve (e.g., a Ram valve) and an accompanying modulating valve (e.g., a v-ball valve) for continuous discharge of the fluid slurry. A Ram valve in a closed position may beneficially provide a surface that is flush with the inner wall of the reactor to preclude the presence of a cavity, space, or void for polymer to collect when the Ram valve is in the closed position.

The CTO assemblies 234 may be located in or adjacent to a downstream end of one of the lower horizontal section or the neighboring elbow section. In one configuration, the continuous take-off (CTO) assemblies 234 are coupled to the fluff slurry product line 22 and connected to extend from at least one of the elbow sections 230 to help recover solid polyolefin product particles, without affecting the circulating velocity of the fluid slurry. In another configuration, the CTO assembly 234 may be an elongated hollow appendage coupled to the transfer slurry line 21 and configured to continuously take off an intermediate product slurry.

In addition, one or more CTO assemblies 234 can be positioned in an area near the last point within the loop reaction zone, where the flow of the slurry turns upward. In another configuration, the CTO) assemblies 234 can be positioned prior to a catalyst feed line, such as the feed line 60, so as to allow a maximum possible retention time for a catalyst freshly introduced into the loop reactor 300 before the catalyst passes a take-off point (i.e., the location of the CTO assembly 234) for the first time.

In general, the continuous take off assemblies 234 can be positioned on any horizontal, vertical, or elbow sections within the loop reactor 300. Also, the section of the loop reactor 300, to which the CTO appendage is attached, can be of a larger diameter to slow down the flow of the fluid slurry flowing therein and hence further allow stratification of the fluid flow so that the product coming off can have an even greater concentration of solids.

In operation, depending on the positioning of the discharge valve on the loop reactor, for example, a discharged fluid slurry having a greater solids concentration than the fluid slurry circulating within the loop reactor may be realized with a discharge configuration having an isolation valve (Ram valve) alone, or having a CTO configuration with an isolation valve (Ram valve) and a modulating valve. Exemplary CTO configurations and other discharge configurations may be found in U.S. Patent Application Publication No. 2011/0288247, and in U.S. Pat. No. 6,239,235. Both are incorporated herein by reference in their entirety. In certain examples, the CTO assemblies 234 may have a Ram valve connected to the wall of the loop reactor, and a modulating flow control valve (e.g., v-ball control valve) connected to the discharge fluid line (e.g., the fluff slurry product line 22, the transfer slurry line, etc.) In an alternate embodiment, the product fluff slurry may be discharged through a settling leg configuration in lieu of a CTO.

In FIG. 3B, the loop reactor 310 includes one or more settling leg assemblies 232 configured to extend from at least one of the horizontal sections 220 and coupled to the fluff slurry product line 22. Each horizontal section 220 may include a single settling leg or multiple settling legs as long as the horizontal space permits. The settling legs are generally connected to the reduced horizontal dimension of the horizontal section 220.

Alternatively, the settling leg assemblies 232 may be configured to extend from the elbow sections 230. The settling leg assemblies 232 may include one or more valve mechanisms, such as an isolation valve (e.g., a Ram valve) or other valve configurations. The valves within the settling leg assemblies 232 are configured to continuously settle and periodically withdraw the fluid slurry. Also, the valves within the settling leg assemblies 232 can be used to accumulate the fluid slurry settled therein and periodically withdraw the fluid slurry into the transfer slurry line 21 and/or the fluff slurry product line 22.

As shown in FIGS. 3A-3B, the loop reactors 300, 310 may include at least one loop reaction zone formed of four vertical sections 210, four horizontal sections 220, and eight elbow sections 230 connected together. Alternatively, the loop reaction zone is formed of six vertical sections, six horizontal sections, and twelve elbow sections connected together. Loop reactions zones with more than six vertical and horizontal sections and more than twelve elbow sections are also within the scope of this invention. Most importantly, the configuration of the loop reactors 300, 310 are designed to take advantage of vertical gravity pull, one or more high performance circulation pumps coupled thereto (e.g., the motors 56A, 56B, the pump 54A, 54B, or other suitable pumps, and the CTO assembly 134 (or continuous settling legs) to help increase the flow rate and the velocity of the fluid slurry circulating within the loop reactors 300, 310, leading to high concentration of the circulating slurry, and ultimately high yield of the solid particle products taking off from the circulating slurry.

Figure 3D:
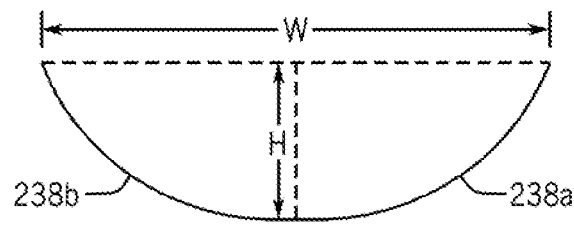
FIG. 3D illustrates an arc with its chord length (W) and height (H), where the arc is formed by the inner curvatures of two identical elbow sections.

FIG. 3C depicts an exemplary portion of a loop reactor and the adjacent elbow section 230 within the polyolefin production system 100. The loop reactor can be any of the loop reactors 50A, 50B, 300, 310. The loop reactor may include a plurality of elbow sections 230, each elbow section 230 having an internal diameter (d) and a radius ($R_c$) of an inner curvature 238. The flow of the fluid slurry within the elbow section 230 is indicated by an arrow "F". Assuming two inner curvatures of two elbow sections 230 form an arc, as illustrated in FIG. 3D as an inner curvature 238a and an inner curvature 238b, each elbow section 230 has a height (H) measured from a midpoint of the arc. In addition, each of the inner curvature 238a and the inner curvature 238b has a length, which is half of the chord length (W) of the arc, i.e., W/2. Accordingly, an inner curvature 238 of the elbow section 230 as shown in FIG. 3C has a length of W/2.

As shown in the example in FIG. 3C, the elbow section 230 (e.g., at least one elbow section within any of the loop reactors 50A, 50B, 300, 310) may be connected to an elbow flow meter 370 (sometimes referred to as a Smart Ell). For example, an inner pressure tap 362 and an outer pressure tap 364 may be positioned about the inner and outer walls of the elbow section 230 to detect and measure a pressure differential between the inner and outer walls of the elbow section 230.

In one example, the inner pressure tap 362 and the outer pressure tap 364 are flushed continuously with a diluent (e.g., isobutane or in some case recycle isobutene) at a relatively high rate to prevent polymer slurry from plugging the components of the elbow flow meter 370. In another example, the inner pressure tap 362 and the outer pressure tap 364 may include an inner diaphragm 352 and an outer diaphragm 354, respectively, at the inner and outer walls of the elbow section 230, such that the inner pressure tap 362 and the outer pressure tap 364 can be protected from being plugged or fouled with polymer slurry. With the use of the inner diaphragm 352 and the outer diaphragm 354, a diluent flush may not be necessary. The elimination of the diluent flush may reduce the demand for an olefin-free diluent. Moreover, the elimination of the diluent flush at the inner pressure tap 362 and the outer pressure tap 364 may generally improve the consistency of the pressure measurements obtained from the elbow flow meter 370.

In one embodiment, at least an elbow section within the loop reaction zone of the loop reactor is configured to minimize friction loss. Referring to FIG. 3C, for example, the radius ($R_c$) and the internal diameter (d) of the elbow section. 230 can be configured to minimize friction loss of the fluid slurry within the elbow section 230. In one example, a ratio ($R_c$/d) of the radius ($R_c$) and the internal diameter (d) of the elbow section 230 is maintained between about 1 and about 10, or between about 2 and about 4. One of skill in the an would understand, particularly in light of the present disclosure, that the measured parameters used to calculate the values of the radius ($R_c$) and the internal diameter (d) of the elbow section 230 and the Re/d ratio referenced herein must be converted to like or consistent units before making the calculation, even that the units cancel each other out to result in the $R_c$/d ratio.

In another embodiment of the present invention, the loop reactor maintains a high circulation velocity (V) and a high flow rate (e.g., a high Reynolds number, a high Dean number ($D_n$), etc.) for the circulating fluid slurry, especially within the elbow section 230. The circulation velocity (V) may be measured, for example, by the elbow flow meter 370 which may be coupled to the inner pressure tap 362 and the outer pressure tap 364 on the inner and outer walls, respectively, of the elbow section 230. In one example, the circulating velocity (V) of the slurry in the elbow section 230 is about 6 meters per second (6 m/s) or higher, such as about 9 m/s or higher. In another example, the Dean number is maintained to be higher than 3,000,000, where $D_n=\rho V d/\mu *(d/2R_c)^{1/2}$ and where $\rho$ is a density of the fluid slurry as measured in an unit of, for example, lb/ft3, where V is the circulating velocity of the slurry in the elbow section as measured in an unit of, for example, meters per second, where d is the internal diameter of the elbow section 230 as measured in an unit of, for example, feet or inches, and where p is a dynamic viscosity of the fluid slurry as measured in an unit of, for example, lb/ft/sec. In another example, a Reynolds number ($N_{RE}$) of the fluid slurry within the at least one elbow section, where $N_{RE}=\rho V d/\mu$, can be maintained at about 11,000,000 or higher.

Both Dean numbers and Reynolds numbers are dimensionless numbers. One of skill in the art would understand, particularly in light of the present disclosure, that the measured parameters used to calculate the dimensionless numbers referenced herein must be converted to like or consistent units before making the calculation such that the units cancel each other out to result in the dimensionless number.

In FIG. 3C, a portion of the arc of the inner curvature of the elbow section 230 is shown in dotted curve line. In an embodiment, it is contemplated to reduce the chord length (W) of the are of the inner curvature 238 in the elbow section 230. In one embodiment, the chord length (W) of the inner curvature 238 in the elbow section 230 is configured to be about 250 inches or less. In another embodiment, the radius ($R_c$) of the inner curvature in the elbow section 230 is configured to be about 72 inches or less, as measured as $R_c=H/2+W^2/8H$.

In addition, it is contemplated to adjust the dimension, various parameters, and configuration of the elbow section 230 and reduce friction loss of the slurry flowing therein. In one embodiment, a ratio ($R_c$/d) of the radius ($R_c$) of the inner curvature and the internal diameter (d) of the elbow section 230 is configured to be maintained between about 1 and about 10, or between about 2 and about 4 to reduce friction loss.

Further, the circulation velocity (V) of the slurry flowing through the loop reaction zone within the reactors 300, 310 generally encounter no interference within the vertical sections; accordingly, it is contemplated to configure the dimension of the elbow section 230 in order to maintain the circulation velocity (V) of the slurry flowing through the elbow section 230, where the circulation velocity (V) of the slurry correlates with the internal diameter (d) and the radius ($R_c$) of the inner curvature of the elbow section 230. For example, the circulation velocity (V) of the slurry flowing through the elbow section 230 can be adjusted according to V equals to $\mu *D_n$ divided by $\rho *d*(d/2R_c)^{1/2}$, $$V = \frac{\mu D_n}{\rho d \left(\frac{d}{2R_c}\right)^{1/2}}$$

where $\mu$ is the dynamic viscosity of the slurry, $D_n$ is the Dean number of the slurry, $\rho$ is the density of the slurry, d is the internal diameter of the elbow section 230, and $R_c$ is the radius of the inner curvature 238 of the elbow section 230. In one example, the circulation velocity (V) of the slurry within the at least one loop reaction zone is maintained at about 9 meters per second or higher. In another example, the circulation velocity (V) of the slurry within the at least one loop reaction zone is maintained at about 9 meters per second or lower. Still further, a Reynolds number ($N_{RE}$) of the slurry flowing in the elbow section 230 can also be maintained by adjusting the dimension, various parameters and configuration of the elbow section. In one example, the Reynolds number of the slurry within the elbow section 230 is maintained at about 11,000,000 or higher.

Figure 4:
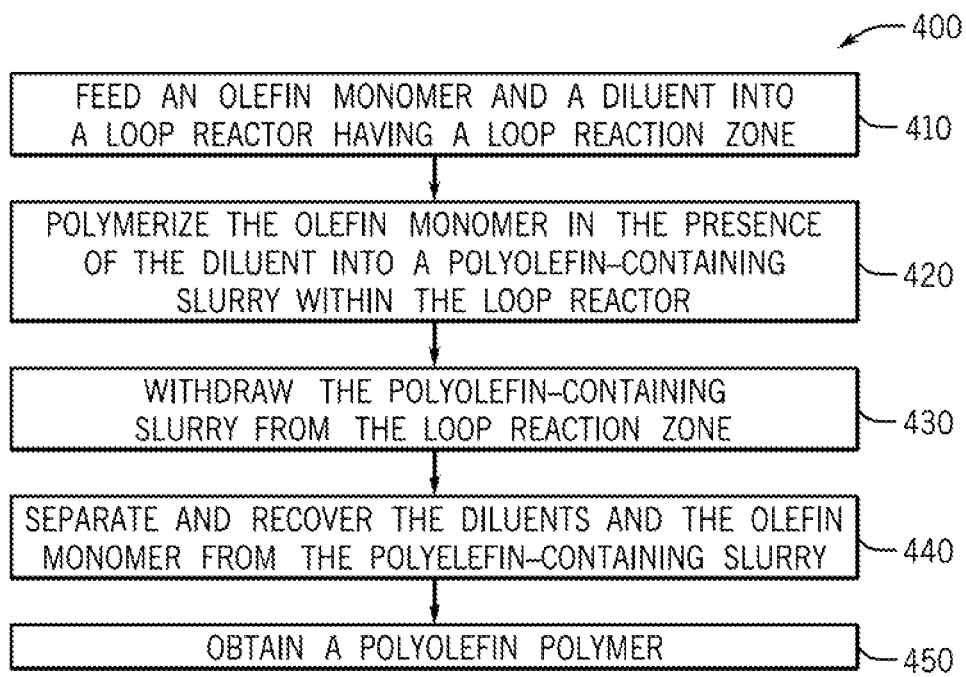
FIG. 4 illustrates an exemplary process flow diagram of a method of operating a polyolefin manufacturing system in accordance with embodiments of the present techniques.

FIG. 4 illustrates a process 400 of operating a polyolefin manufacturing system, such as the polyolefin production system 100 as shown in FIG. 1. The process 400 is provided for olefin polymerization in a loop reaction zone of a reactor system, such as the reactor system 20, 200 with one or more loop reactors 50A, 50B, 300, 310. In the polyolefin production system 100, one or more olefin monomers and optionally comonomers are polymerized to form product polymer particulates, typically called fluff or granules. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, are selected to achieve desired fluff properties.

At step 410, an olefin monomer and a diluent are fed into a loop reactor system having a loop reaction zone therein. For example, monomers and diluents supplied from the feedstocks 14 are fed through the feed system 16 into the reactor system 20 via the feed lines 18. In one example, the monomer is ethylene and the comonomer is 1-hexene. In another example, the monomer is propylene and the comonomer is ethylene.

In the case of an ethylene monomer, an ethylene feedstock may be supplied via a feed line at approximately 800-1450 pounds per square inch gauge (psig) at a temperature between about 45° F. and about 65° F. (about 7° C. and about 18° C.). A hydrogen feedstock may be supplied via a separate feed line, but at approximately 900-1000 psig at a temperature between about 90° F. and about 110° F. (about 32° C. and about 43° C.). Of course, a variety of supply conditions can be used for delivering ethylene, hydrogen, and other feedstocks 14.

In addition to the olefin monomers and comonomers, a catalyst that facilitates polymerization of the ethylene monomer is added to the loop reactor. The catalyst may be a particle suspended in a fluid medium within the loop reactor. In general, Ziegler catalysts, Ziegler-Natta catalysts, metallocene catalysts, chromium catalysts, and other well-known polyolefin catalysts, as well as co-catalysts, may be used. Typically, an olefin-free diluent or mineral oil, for example, is used in the preparation and/or delivery of the catalyst in a feed line (e.g., the feed line 18) that taps into the wall of the polymerization reactor. Further, a diluent may be fed into the loop reactor, typically a liquid-phase loop reactor.

At step 420, the olefin monomer, which is supplied into a loop reactor, such as the loop reactors 50A, 50B, 300 310, is then polymerized in the presence of a liquid diluent into a polyolefin-containing fluff slurry. The fluff slurry may contain solid particles of a polyolefin polymer. The diluent may be an inert hydrocarbon, such as isobutane, propane, n-butane, n-pentane, i-pentane, neopentane, n-hexane, cyclohexane, cyclopentane, methylcyclopentane, ethylcyclohexane, combinations thereof and the like, which is in its liquid phase at reaction conditions. The use of the diluent is to suspend the catalyst particles and polymer fluff into a slurry mixture within the loop reactor. The diluent, as its name indicated, may also be used to flush the internal volume of the loop reactor or fluid lines, to mitigate plugging or fouling, to facilitate flow of the polymer slurry in conduits and lines within the production system, and so on. Moreover, in examples of polypropylene production, the propylene monomer itself may act as a diluent.

Each loop reactor may include a plurality of vertical sections and a plurality of elbow sections connecting the vertical sections to either a horizontal section or another elbow section. In addition, at least one elbow section may have an internal diameter (d) and a radius ($R_c$) of an inner curvature, which can be adjusted maintain a Dean number ($D_n$) of the slurry flowing therein to be higher than 3,000,000, where $D_n = \rho V d / \mu * (d/2R_c)^{1/2}$ and where $\rho$ is a density of the slurry, V is a circulation velocity of the slurry, and $\mu$ is a dynamic viscosity of the slurry. Exemplary vertical section, horizontal section and elbow section dimensions are shown in Tables 1-2.

TABLE 1

Chord length (W), height (H), and radius of curvature ($R_c$) of exemplary elbow sections.

| W (inches) | H (inches) | $R_c$ (inches) | $R_c$ (feet) |
|---|---|---|---|
| 72 | 36 | 36 | 3.0 |
| 72 | 24 | 39 | 3.3 |
| 72 | 12 | 60 | 5.0 |
| 72 | 6 | 111 | 9.3 |
| 60 | 36 | 30.5 | 2.5 |
| 60 | 24 | 30.8 | 2.6 |
| 60 | 12 | 43.5 | 3.6 |
| 60 | 6 | 78.0 | 6.5 |
| 48 | 36 | 26.0 | 2.2 |
| 48 | 24 | 24.0 | 2.0 |
| 48 | 12 | 30.0 | 2.5 |
| 48 | 6 | 51.0 | 4.3 |
| 36 | 36 | 22.5 | 1.9 |
| 36 | 24 | 18.8 | 1.6 |
| 36 | 12 | 19.5 | 1.6 |
| 36 | 6 | 30.0 | 2.5 |
| 24 | 36 | 20.0 | 1.7 |
| 24 | 24 | 15.0 | 1.3 |
| 24 | 12 | 12.0 | 1.0 |
| 24 | 6 | 15.0 | 1.3 |
| 12 | 36 | 18.5 | 1.5 |
| 12 | 24 | 12.8 | 1.1 |
| 12 | 12 | 7.5 | 0.6 |
| 12 | 6 | 6.0 | 0.5 |

TABLE 2

Diameter (d), radius of curvature ($R_c$), $R_c/d$ ratio, fluid flow rate (V), Reynolds number (($N_{RE}$), and Dean number ($D_n$) values of exemplary elbow sections.

| d (meter) | d (inch) | d (feet) | $R_c$ (inch) | $R_c$ (feet) | $R_c/d$ | V (m/s) | V (feet/s) | $N_{RE}$ | $D_n$ |
|---|---|---|---|---|---|---|---|---|---|
| 0.61 | 24.0 | 2.0 | 72 | 6 | 3 | 12.2 | 40 | 15,053,763 | 6,145,673 |
| 0.61 | 24.0 | 2.0 | 72 | 6 | 3 | 11.0 | 36 | 13,548,387 | 5,531,106 |
| 0.61 | 24.0 | 2.0 | 72 | 6 | 3 | 10.4 | 34 | 12,795,699 | 5,223,822 |
| 0.61 | 24.0 | 2.0 | 72 | 6 | 3 | 9.8 | 32 | 12,043,011 | 4,916,539 |
| 0.61 | 24.0 | 2.0 | 72 | 10 | 5.0 | 9.1 | 30 | 11,290,323 | 3,570,313 |
| 0.61 | 24.0 | 2.0 | 72 | 8 | 4.0 | 9.1 | 30 | 11,290,323 | 3,991,732 |
| 0.61 | 24.0 | 2.0 | 72 | 6 | 3.0 | 9.1 | 30 | 11,290,323 | 4,609,255 |
| 0.61 | 24.0 | 2.0 | 60 | 5 | 2.5 | 9.1 | 30 | 11,290,323 | 5,049,186 |
| 0.61 | 24.0 | 2.0 | 48 | 4 | 2.0 | 9.1 | 30 | 11,290,323 | 5,645,161 |
| 0.61 | 24.0 | 2.0 | 36 | 3 | 1.5 | 9.1 | 30 | 11,290,323 | 6,518,471 |
| 0.61 | 24.0 | 2.0 | 24 | 2 | 1.0 | 9.1 | 30 | 11,290,323 | 7,983,464 |
| 0.61 | 24.0 | 2.0 | 12 | 1 | 0.5 | 9.1 | 30 | 11,290,323 | 11,290,323 |
| 0.61 | 24.0 | 2.0 | 6 | 0.5 | 0.3 | 9.1 | 30 | 11,290,323 | 15,966,927 |
| 0.51 | 20.0 | 1.67 | 60.0 | 5.0 | 3.0 | 12.2 | 40 | 12,544,803 | 5,121,394 |
| 0.53 | 21.0 | 1.75 | 63.0 | 5.3 | 3.0 | 12.2 | 40 | 13,172,043 | 5,377,464 |
| 0.56 | 22.0 | 1.83 | 66.0 | 5.5 | 3.0 | 12.2 | 40 | 13,799,283 | 5,633,534 |

TABLE 2-continued

Diameter (d), radius of curvature ($R_c$), $R_c$/d ratio, fluid flow rate (V), Reynolds number (($N_{RE}$), and Dean number ($D_n$) values of exemplary elbow sections.

| d (meter) | d (inch) | d (feet) | $R_c$ (inch) | $R_c$ (feet) | $R_c$/d | V (m/s) | V (feet/s) | $N_{RE}$ | $D_n$ |
|---|---|---|---|---|---|---|---|---|---|
| 0.58 | 23.0 | 1.92 | 69.0 | 5.8 | 3.0 | 12.2 | 40 | 14,426,523 | 5,889,603 |
| 0.61 | 24.0 | 2.00 | 72.0 | 6.0 | 3.0 | 12.2 | 40 | 15,053,763 | 6,145,673 |
| 0.64 | 25.0 | 2.08 | 75.0 | 6.3 | 3.0 | 12.2 | 40 | 15,681,004 | 6,401,743 |
| 0.66 | 26.0 | 2.17 | 78.0 | 6.5 | 3.0 | 12.2 | 40 | 16,308,244 | 6,657,813 |
| 0.69 | 27.0 | 2.25 | 81.0 | 6.8 | 3.0 | 12.2 | 40 | 16,935,484 | 6,913,882 |
| 0.71 | 28.0 | 2.33 | 84.0 | 7.0 | 3.0 | 12.2 | 40 | 17,562,724 | 7,169,952 |
| 0.74 | 29.0 | 2.42 | 87.0 | 7.3 | 3.0 | 12.2 | 40 | 18,189,964 | 7,426,022 |
| 0.76 | 30.0 | 2.50 | 90.0 | 7.5 | 3.0 | 12.2 | 40 | 18,817,204 | 7,682,091 |
| 0.76 | 30.0 | 2.50 | 60.0 | 5.00 | 2.00 | 15.2 | 50 | 23,521,505 | 11,760,753 |

Operation of the loop reactors 50A, 50B may include feeding the same amount of monomer or comonomer and/or the same amount of hydrogen into each loop reactor. An alternative operation may include feeding a greater amount of a comonomer to the first polymerization reactor than to the second polymerization reactor, or vice versa. The feeding step can be conducted concurrently or sequentially. The operation may also include feeding a greater amount of hydrogen to the second polymerization reactor than the first polymerization reactor, or vice versa. Further, the same or a different comonomer concentration may be maintained in each reactor 50A, SOB. Likewise, the same or a different hydrogen concentration may be maintained in each reactor 50A, 50B. Furthermore, the first polyolefin (i.e., polyolefin polymerized in the first reactor 50A) may have a first range of physical properties, and the second polyolefin (i.e., polyolefin polymerized in the second reactor 50B) may have a second range of physical properties. The first range and the second range of physical properties may be the same or different. Exemplary physical properties include but are not limited to polyolefin density, comonomer percentage, short chain branching amount, molecular weight, viscosity, melt index, melt flow rate, crystallinity, and the like.

At step 430, the slurry is withdrawn from the loop reactor zone. In one example, the slurry is continuously withdrawn from one or more continuous take off assemblies extending from at least one of the elbow sections or the horizontal sections. In another example, the slurry is periodically withdrawn from one or more settling leg assemblies extending from the horizontal section 220.

Moreover, a differing amount of polyolefin may be produced and withdrawn from the loop reactor 50A, 50B. For example, the first polyolefin product produced from the loop reactor 50A may be 30 weight % to 70 weight % of the second polyolefin product produced from the loop reactor 50B, or vice versa. The different amount of polyolefin production in the loop reactors 50A, 50B may be accommodated and adjusted with different process conditions and/or system configurations and so on.

At step 440, the diluents and the olefin monomers within the fluid slurry are separated from the polyolefin polymer particles. For example, the diluents and the olefin monomers may be separated and recovered within the recovery system 24, as described below. At step 450, a polyolefin polymer is obtained from the polyolefin production system 100, as described below.

Referring back to FIG. 1, the reactor system 20 having one or more loop reactors coupled thereto is connected to the recovery system 24 via the fluff slurry product line 22. The recovery system 24 is configured to receive the fluid slurry discharged from the reactor system 20 and separate the fluid slurry into a polyolefin fluff stream 28 and non-polymer components. For example, the liquid in the fluid slurry can be treated within the recovery system 24 to be partially or fully vaporized in a flash line (not shown). The vapor of the non-polymer components (e.g., diluent and unreacted monomer) can be separate from the polyolefin fluff stream 28. Examples of non-polymer components present in the polyolefin fluff may includes diluents, unreacted monomer/comonomer, and residual catalysts.

A flash line with a flash line heater coupled thereto can be used to vaporize and volatize diluents and increase enthalpy of the fluid slurry. The flash line and the flash line heater may be configured as part of the reactor system, part of the recovery system 24, or alternatively, disposed between the reactor system 20 and the recovery system 24.

The non-polymer components can be recovered from a vapor phase into a liquid phase within the recovery system 24. In addition, the recovery system 24 may be configured to remove undesirable heavy and light chains from the non-polymer components. For example, olefin-free diluent may be recovered from the recovery system 24 and reused, by delivering to the feed system 16 and/or the reactor system 20.

The non-polymer components may be delivered through one or more non-polymer flow-lines 26 to the fractionation system 30 to be fractionated and/or treated into fractionations of recovered non-polymer diluent, monomer, and/or catalyst components. The fractionations of non-polymer components are thus recovered and reused by delivering the fractions into the reactor system 20, directly or via a fractionation feed line 32, which is connected to the feed system 16. A by-pass line feed 34 can be used to deliver the non-polymer components from recover system 24 (e.g., via the non-polymer flow-line 26) to the feed line 16 (e.g., via the fractionation feed line 32) by bypassing the fractionation system 30.

The polyolefin fluff stream 28 discharged from the recovery system 24 is then delivered to the extrusion system 36 and extruded into a polyolefin pellet 38 with desired mechanical, physical, and melt characteristics. The extrusion system 36 may include an extruder (e.g., a pelletizer), which is configured to add additives to a feed of the polyolefin fluff stream 28 to impart desired characteristics of the polyolefin pellets 38 finally obtained. The extruder heats and melts the feed of the polyolefin fluff stream 28, and extrudes the feed (e.g., via a twin screw extruder) through a pelletizer die under pressure to obtain the polyolefin pellets 38. Such pellets can be cooled in a water system disposed at or near the discharge of the pelletizer. Suitable additives introduced to the feed of the polyolefin fluff stream 28 to form the polyolefin pellets 38 may include surface modifiers (e.g., slip agents, antiblocks, tackifers), UV inhibitors, antioxidants (e.g., phenolics, phosphites, thioesters, amines, etc.), colorants, pigments, processing aids (e.g., flow promoters such as waxes & oils and fluoroeslastomers), peroxides, and other additives. Different additives may be combined into different additive packages to be dispensed into one or more extruder feed tanks and extruders for obtaining polyolefin pellets 38 of different desired characteristics.

As shown in FIG. 1, the dry finish end 44 of the polyolefin production system 100 also includes the loadout system 39 configured to prepare the polyolefin pellets 38 for shipment to customers 40. In general, the polyolefin pellets 38 may be transported to a loadout area to be stored, blended with other pellets, and/or loaded into railcars, trucks, bags, and so forth. However, the polyolefin pellets 38 are generally not altered by the loadout system 39 prior to being sent to the customer 40.

Polyolefin pellets 38 generated from the polyolefin production system 100 may include low density polyethylene (LDPE), linear low density polyethylene (LLDPE), medium density polyethylene (MDPE), high density polyethylene (HDPE), enhanced polyethylene, isotactic polypropylene (iPP), syndiotactic polypropylene (sPP), including various copolymers, and so on. The polyolefin pellets 38 may be used in the manufacturing of a variety of products, components, household items and other items, including but not limited to adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

To manufacture the end-products, the polyolefin pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components made from the polyolefin pellets 38 may be further processed and assembled for distribution and sold to consumers. For example, extruded pipe or film may be packaged for distribution to the customer, or a fuel tank comprising polyethylene may be assembled into an automobile for distribution and sold to consumers.

Process variables and parameters in the polyolefin production system 100 may be controlled automatically and/or manually via various valve configurations, control systems, and so on. In general, a processor-based control system, such as the control system 46 as shown in FIG. 1, may facilitate management of a range of operations in the polyolefin production system 100. A polyolefin manufacturing facility may include a central control room, as well as a central control system, such as a distributed control system (DCS) and/or programmable logic controller (PLC). For example, the reactor system 20 may employ a processor-based system, such as a DCS, or other advanced process control systems known in the art. The control system 46 may include one or more DCS to control the feed system 16, the reactor system 20, the recovery system 24, and/or the fractionation system 30. In the dry end 44 of a polyolefin production plant, the extrusion system 36 and/or the pellet loadout system 39 may also be controlled via a processor-based system (e.g., DCS or PLC). Moreover, computer-readable media may store control system executable codes to be executed by associated processors including central processing units, and the like. The computer readable medium can refer to any storage medium that may be used to in conjunction with computer readable instructions. In an exemplary and non-limiting illustrative embodiment, the computer readable medium can include a computer readable storage medium. The computer readable storage medium can take many forms, including, but not limited to, non-volatile media and volatile media, floppy disks, flexible disks, hard disks, magnetic tape, other magnetic media, CD-ROMs, DVDs, or any other optical storage medium, punch cards, paper tape, or any other physical medium with patterns of holes. Computer readable storage media can further include RAM, PROM, EPROM, EEPROM, FLASH, combinations thereof (e.g., PROM EPROM), or any other memory chip or cartridge. The computer readable medium can further include computer readable transmission media. Such transmission media can include coaxial cables, copper wire and fiber optics. Transmission media may also take the form of acoustic or light waves, such as those generated during radio frequency, infrared, wireless, or other media comprising electric, magnetic, or electromagnetic waves.

Accordingly, the DCS and associated control system(s) in the polyolefin production system 100 may include appropriate hardware software logic and codes, to interface with the various process equipment, control valves, conduits, and instrumentation, to facilitate the measurement and control of process variables, to implement control schemes, to perform calculations, and so on. A variety of instrumentation known to those of ordinary skill in the art may be provided to measure process variables, such as pressure, temperature, flow rate, and so on and to transmit a signal to the control system 46, where the measured data may be read by an operator and/or used as an input in various control functions. Depending on the application and other factors, indication of the process variables may be read locally or remotely by an operator, and used for a variety of control purposes via the control system.

A plant manager, engineer, technician, supervisor and/or operator can monitor and control the process in the control room. When using a DCS, the control room may be the center of activity, facilitating the effective monitoring and control of the process or facility. The control room and DCS may contain a Human Machine Interface (HMI), which may be a computer, with specialized software to provide a user-interface for the control system. The HMI may vary by vendor and present the user with a graphical version of the manufacturing process conducted within the polyolefin production system 100. There may be multiple HMI consoles or workstations, with varying degrees of access to data.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A loop reactor for olefin polymerization, the loop reactor comprising:
    a plurality of vertical sections;
    a plurality of elbow sections connecting the vertical sections to either a horizontal section or another elbow section, at least one elbow section having an internal diameter (d) and a radius ($R_c$) of an inner curvature; and
    at least one loop reaction zone configured to polymerize an olefin monomer in the presence of a liquid diluent into a slurry comprising particles of a polyolefin polymer, wherein the at least one elbow section is configured to maintain a Dean number ($D_n$) of the slurry flowing therein to be higher than 3,000,000, where $D_n = \rho V d/\mu * (d/2R_c)^{1/2}$ and where $\rho$ is a density of the slurry, V is a circulation velocity of the slurry, and $\mu$ is a dynamic viscosity of the slurry.

2. The loop reactor of claim 1, wherein a horizontal length ($L_H$) of the horizontal section is less than about 3 feet.

3. The loop reactor of claim 1, wherein a horizontal length ($L_H$) of the horizontal section is between about 0.5 feet and about 2.0 feet.

4. The loop reactor of claim 1, wherein the at least one elbow section connects a vertical section to the horizontal section.

5. The loop reactor of claim 1, wherein the at least one elbow section connects a vertical section to the another elbow section.

6. The loop reactor of claim 1, further comprises one or more settling leg assemblies extending from the horizontal section.

7. The loop reactor of claim 1, further comprises one or more continuous take off (CTO) assemblies extending from at least one of the elbow sections or the horizontal section.

8. The loop reactor of claim 1, wherein at least one of the continuous take off (CTO) assemblies comprises a valve.

9. The loop reactor of claim 1, wherein a ratio ($R_c/d$) of the radius ($R_c$) of the inner curvature and the internal diameter (d) of the at least one elbow section is maintained between about 1 and about 10.

10. The loop reactor of claim 1, wherein the at least one elbow section comprises a height (H) and a chord length (W), wherein the chord length is about 250 inches or less, and wherein the radius ($R_c$) of the inner curvature, measured as $R_c = H/2 + W^2/8H$, is 72 inches or less.

11. The loop reactor of claim 1, wherein the circulation velocity (V) of the slurry within the at least one loop reaction zone is maintained at about 9 meters per second or higher.

12. The loop reactor of claim 1, wherein the circulation velocity (V) of the slurry within the at least one loop reaction zone is maintained at about 9 meters per second or lower.

13. The loop reactor of claim 1, wherein the circulation velocity is measured by an elbow flow meter coupled to at least one elbow section.

14. The loop reactor of claim 1, wherein a Reynolds number of the slurry within the at least one elbow section is maintained at about 11,000,000 or higher.

15. The loop reactor of claim 1, wherein at least one loop reaction zone is formed by four vertical sections, four horizontal sections, and eight elbow sections.

16. The loop reactor of claim 1, wherein at least one loop reaction zone is formed by six vertical sections, six horizontal sections, and twelve elbow sections.

17. The loop reactor of claim 1, wherein two loop reaction zones are formed, each loop reaction zone is formed by four vertical sections, four horizontal sections, and eight elbow sections.

18. The loop reactor of claim 1, wherein the two loop reaction zones are connected to continuously transfer the slurry therein.

19. The loop reactor of claim 1, wherein a volume of the loop reactor is measured at more than about 10,000 gallons.

20. The loop reactor of claim 1, wherein the polyolefin polymer is selected from the group consisting of polypropylene, polyethylene, and combinations thereof.

21. A reactor system for olefin polymerization, the reactor system comprising:
    one or more reactors configured for processing polyolefin; and
    a loop reactor, comprising:
        a plurality of vertical sections;
        a plurality of elbow sections connecting the vertical sections to either a horizontal section or another elbow section, at least one elbow section having an internal diameter (d) and a radius ($R_c$) of an inner curvature; and
        at least one loop reaction zone configured to polymerize an olefin monomer in the presence of a liquid diluent into a slurry comprising particles of a polyolefin polymer, wherein the at least one elbow section is configured to maintain a Dean number ($D_n$) of the slurry flowing therein to be higher than 3,000,000, where $D_n = \rho V d/\mu * (d/2R_c)^{1/2}$ and where $\rho$ is a density of the slurry, V is a circulation velocity of the slurry, and $\mu$ is a dynamic viscosity of the slurry.

22. A process for olefin polymerization in a loop reactor, the process comprising:
    polymerizing an olefin monomer in the presence of a liquid diluent into a slurry comprising particles of a polyolefin polymer inside at least one loop reaction zone of a loop reactor, wherein the loop reactor comprises:
        a plurality of vertical sections; and a plurality of elbow sections connecting the vertical sections to either a horizontal section or another elbow section, at least one elbow section having an internal diameter (d) and a radius ($R_c$) of an inner curvature, wherein the at least one elbow section is configured to maintain a Dean number ($D_n$) of the slurry flowing therein to be higher than 3,000,000, where $D_n=\rho Vd/\mu*(d/2R_c)^{1/2}$ and where $\rho$ is a density of the slurry, V is a circulation velocity of the slurry, and $\mu$ is a dynamic viscosity of the slurry.

23. The process of claim 22, further comprises:
withdrawing the slurry from the at least one loop reactor zone.

24. The process of claim 23, wherein the slurry is continuously withdrawn from one or more continuous take off assemblies extending from at least one of the elbow sections or the horizontal section.

25. The process of claim 23, wherein the slurry is periodically withdrawn from one or more settling leg assemblies extending from the horizontal section.

26. The process of claim 22, wherein a horizontal length ($L_H$) of the horizontal section is less than about 3 feet.

27. The process of claim 22, wherein a horizontal length ($L_H$) of the horizontal section is between about 0.5 feet and about 2.0 feet.

28. The process of claim 22, wherein a ratio ($R_c/d$) of the radius ($R_c$) of the inner curvature and the internal diameter (d) of the at least one elbow section is maintained between about 1 and about 10.

29. The process of claim 22, wherein the circulation velocity (V) of the slurry within the at least one loop reaction zone is maintained at about 9 meters per second or higher.

30. The process of claim 22, wherein the circulation velocity (V) of the slurry within the at least one loop reaction zone is maintained at about 9 meters per second or lower.

31. The process of claim 22, wherein the circulation velocity (V) of the slurry within the at least one loop reaction zone is measured by an elbow flow meter coupled to at least one elbow section.

32. A process for olefin polymerization in a loop reactor, the process comprising:

polymerizing an olefin monomer in the presence of a liquid diluent into a slurry comprising particles of a polyolefin polymer inside at least one loop reaction zone of a loop reactor, wherein the loop reactor comprises:

a plurality of vertical sections; and a plurality of elbow sections connecting the vertical sections to a horizontal section, wherein a horizontal length ($L_H$) of the horizontal section is about 3 feet or less, wherein at least one elbow section has an internal diameter (d) and a radius ($R_c$) of an inner curvature and is configured to maintain a Dean number ($D_n$) of the slurry flowing therein to be higher than 3,000,000, where $D_n=\rho Vd/\mu*(d/2R_c)^{1/2}$ and where $\rho$ is a density of the slurry, V is a circulation velocity of the slurry, and $\mu$ is a dynamic viscosity of the slurry; and continuously withdrawing the slurry from the at least one loop reactor zone.

* * * * *